United States Patent [19]

Enk et al.

[11] Patent Number: 4,670,036

[45] Date of Patent: Jun. 2, 1987

[54] CONVEYING, SUPPORTING AND SHAPING GLASS SHEETS

[75] Inventors: Allan T. Enk, Toledo, Ohio; Jeffery R. Flaugher, Carlton, Mich.; Floyd T. Hagedorn, Oregon; Herbert A. Leflet, Jr., Toledo, both of Ohio

[73] Assignee: Libbey-Owens-Ford Co., Toledo, Ohio

[21] Appl. No.: 870,568

[22] Filed: Jun. 4, 1986

[51] Int. Cl.⁴ .............................................. C03B 23/03
[52] U.S. Cl. ...................................... 65/106; 65/107; 65/273; 65/289
[58] Field of Search ................. 65/106, 107, 273, 289, 65/290, 291

[56] References Cited

U.S. PATENT DOCUMENTS

| | | | |
|---|---|---|---|
| 3,869,271 | 3/1975 | Shaffer et al. | 65/273 |
| 3,905,794 | 9/1975 | Revells et al. | 65/273 X |
| 4,116,662 | 9/1978 | Revells | 65/273 X |
| 4,305,746 | 12/1981 | Hagedorn et al. | 65/106 |
| 4,612,031 | 9/1986 | Bennett et al. | 65/106 |

Primary Examiner—Arthur Kellogg
Attorney, Agent, or Firm—Marshall & Melhorn

[57] ABSTRACT

A method of and apparatus for press bending glass sheets to a desired shape wherein heated glass sheets are advanced on a series of contoured conveyor rolls having arcuately curved central portions, into position above a press member of outline or ring-type construction. The press member includes a continuous peripheral shaping rail adapted to engage and lift the sheets from the conveyor rolls for pressing between complemental shaping surfaces. The end segments of the contoured rolls extend beneath the shaping rail and away from the glass sheets, and free-wheeling rollers are provided adjacent the shaping rail for supporting the end segments of the sheets while the shaping rail is in its retracted or lowered position.

17 Claims, 7 Drawing Figures

CONVEYING, SUPPORTING AND SHAPING GLASS SHEETS

BACKGROUND OF THE INVENTION

1. Field of the Invention

The present invention relates generally to the production of bent glass sheets, and more particularly to an improved method of and apparatus for supporting and deforming the glass sheets in a press bending operation.

2. Description of the Prior Art

In accordance with one system for mass producing curved or bent glass sheets such as glazing closures for automobiles or the like, the sheets are supported and advanced along a generally horizontal path on the driven rolls of roll-type conveyors successively through heating area and bending areas, and then through a heat treating area for appropriate thermal treatment to anneal or temper the bent sheets as may be desired.

Upon emerging from the heating furnace the heated sheets advance into the bending area and are precisely positioned therein between complemental upper and lower shaping members by retractable locating stops positioned in the path of movement of the advancing sheets so as to engage the leading edges thereof and stop the sheets at the appropriate position. The lower press member is then raised so as to engage the properly oriented sheet around its marginal edge portions and lift the sheet from the conveyor rolls for pressing between the complementary shaping surfaces of the press members to the predetermined desired curvature.

While the sheet is in the highly heated, softened condition necessary for proper bending, it is susceptible to damage which may result in optical defects unacceptable, or at least undesirable, in the finished glazing unit. One such defect is that commonly known as "roll distortion", caused by marring of the sheet surface due to relative frictional movement between the glass surfaces and the rotating conveyor rolls, particularly when the advancing movement of the sheet is interrupted by the locating stops while the conveyor rolls continue to rotate momentarily. This problem is addressed in U.S. Pat. No. 3,905,794. In accordance with the patent, relative movement between the contacting surfaces of the glass sheet and the conveyor rolls is eliminated by providing in the bending area a series of conveyor rolls of generally arcuate form, rotatable about their own axes and also pivotable between a first planar position for supporting a glass sheet prior to the bending thereof, and a second position extending at an angle to the horizontal plane of the first position so as to be out of engagement with the sheet prior to bending and yet supporting a bent sheet of glass while maintaining the desired curvature imparted thereto. Each of the conveyor rolls comprises a non-rotating inner core member and an outer sleeve mounted for rotation about and relative to the inner core member. In order to support the heated sheet throughout its length both before and after it is bent, the conveyor rolls are mounted at their ends outwardly of the press member.

The lower or female press member is generally of ring-type construction having a shaping rail which engages only the peripheral margin of the sheets. In order to permit the shaping rail of the lower press member to be moved vertically between its lowered position beneath the conveyor rolls and its raised position thereabove, the shaping rail is comprised of a plurality of individual segments arranged in spaced, end-to-end relationship in the desired outline pattern. The adjacent ends of the segments are suitably spaced to permit the rolls to pass therebetween. The shaping rails are generally of substantially rectangular configuration in plan so that the two end sections thereof extend substantially normal to the axes of the rolls. Even though the spaces or gaps between adjacent shaping rail segments may thus be minimized, the heat softened glass sheet is unsupported in these spaces as it is lifted by the lower press member so that sagging and marking of the glass may occur. The individual segments must be precisely aligned or they may cause undue marking of the sheet, and thus the segmented shaping rail is more difficult and expensive to fabricate and use than a comparable continuous shaping rail.

More recent automotive styling has dictated the fabrication of more complex and elaborate glass shapes, some of whose outlines require shaping rails having portions intersecting the rolls at acute angles so that the spacing between adjacent shaping rail segments must be significantly increased. This, of course, greatly increases the likelihood of sagging in the spaces between segments. In an effort to avoid this problem, U.S. Pat. No. 4,116,662 employs conveyor rolls formed of two sections whose outer ends have a common axis and whose inner ends are axially offset from each other and are interconnected by an irregularly shaped member. The gap in the shaping rail can thus be minimized so as to accomodate only the interconnecting member, or eliminated entirely by use of a suitably complexly shaped interconnecting member. In either event there is a resulting gap in the supporting surfaces of the conveyor rolls at the interconnected inner ends thereof. Thus, while improved devices have been proposed for bending glass sheets with reduced distortion resulting from marring of the surfaces due to relative frictional movement between the glass surfaces and rolls, as well as from sagging of the heat softened glass in the spaces between adjacent segments of the shaping rail, there remains a need for a press bending apparatus which is not complex and wherein there is provided improved support for the heated glass sheets both during the conveying and the press bending thereof.

SUMMARY OF THE INVENTION

To that end, the present invention includes a glass sheet conveying and shaping apparatus comprising a series of contoured preforming rolls upon which a heated glass sheet is conveyed into position above a lower press member having a continuous peripheral shaping rail adapted to engage and lift the sheet for pressing between complemental shaping surfaces. The end segments of the contoured rolls curve downwardly so as to pass beneath the shaping rail in its lowered position, and free-wheeling rollers are provided for carrying the ends of the sheets advancing into the bending area above the end segments of the lowered shaping rail prior to bending.

It is, therefore, a primary object of the invention to provide an improved method of and apparatus for supporting and conveying glass sheets in a press bending operation.

Another object of the invention is to provide an improved method of and apparatus for press bending glass sheets employing contoured preforming rolls in combination with a continuous peripheral lower shaping member.

Another object of the invention is to provide such a method and apparatus in which the contoured rolls extend beneath the end sections of the lower shaping member so as to avoid the necessity for gaps in the shaping member.

Still another object of the invention is to provide such a method and apparatus including means supporting the end portions of the glass sheet above the contoured rolls and shaping member while the shaping member is in its lowered position.

Yet another object is to provide such apparatus which is relatively simple to construct, operate and maintain.

Other objects and advantages will become more apparent during the course of the following description when taken in connection with the accompanying drawings.

BRIEF DESCRIPTION OF THE DRAWINGS

In the drawings, wherein like numerals refer to like parts throughout.

DESCRIPTION OF THE PREFERRED EMBODIMENT

Figure 1:
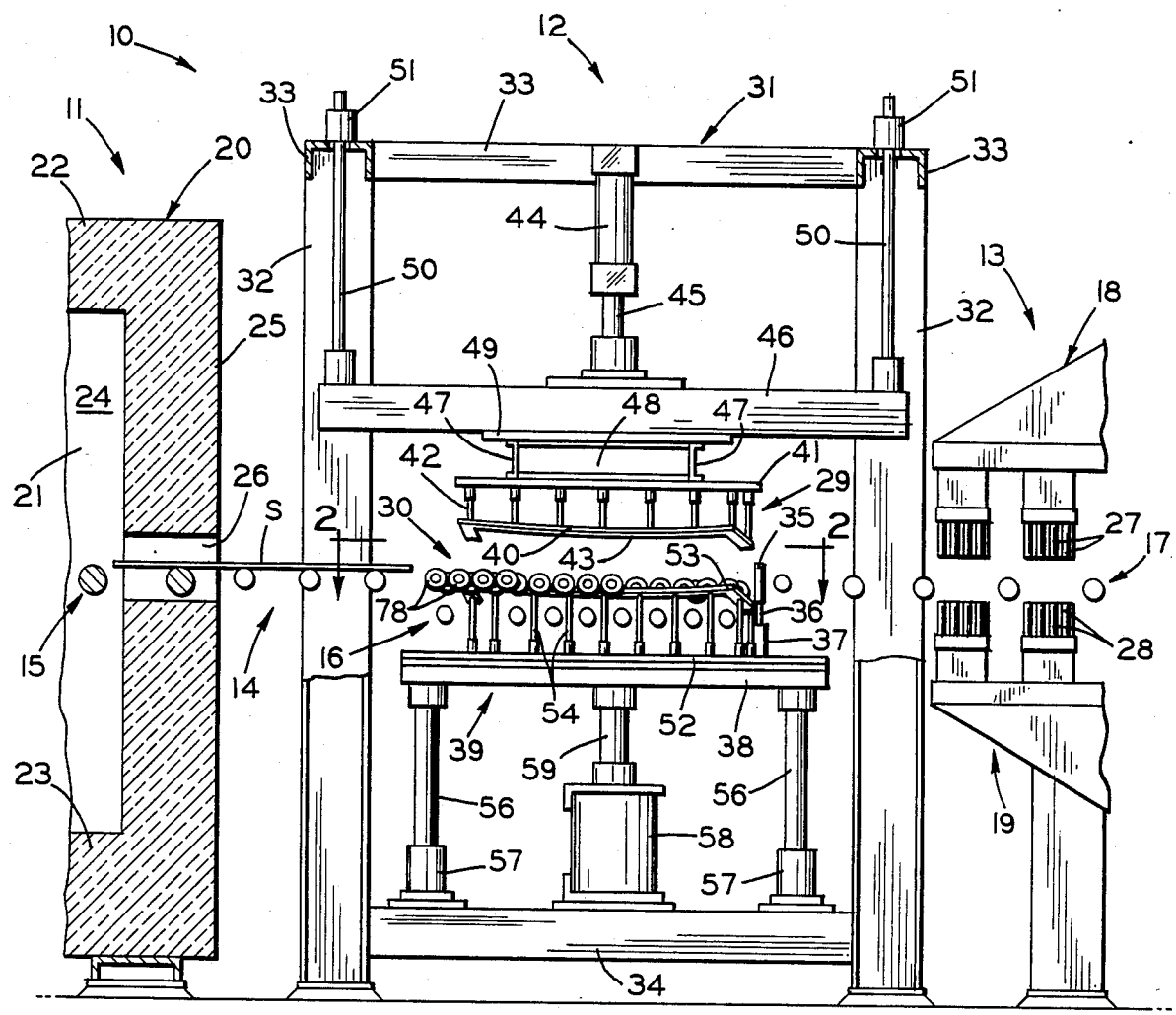
FIG. 1 is a side elevational view of a bending apparatus interposed between a glass heating furnace and a tempering section and incorporating the sheet supporting and conveying apparatus of the invention.
Figure 3:
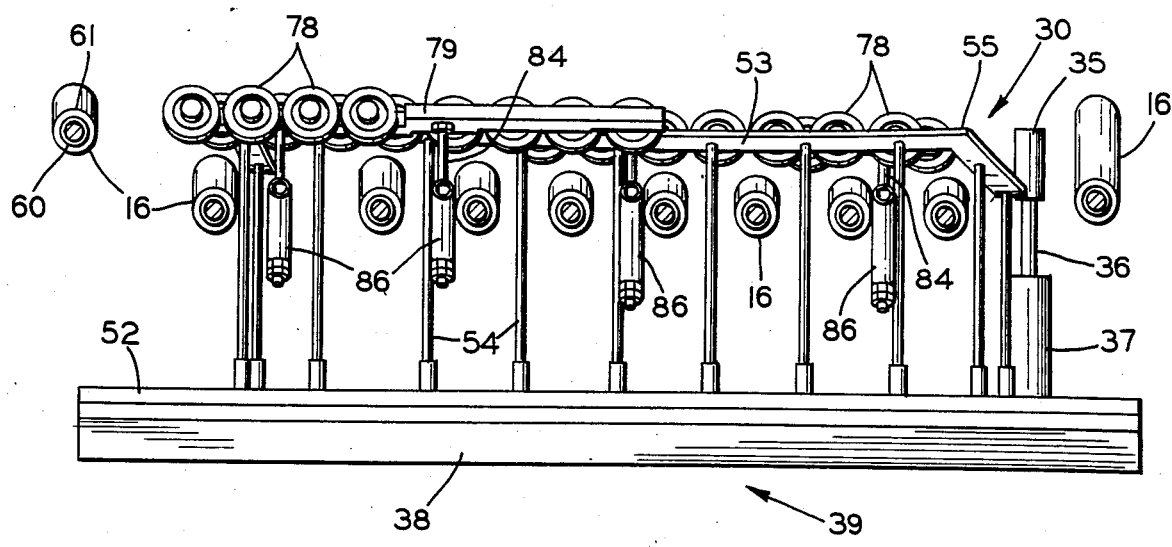
FIG. 3 is an enlarged, side elevational view, partly in section, taken substantially along line 3—3 of FIG. 2.

Referring now to the drawings and in particular to FIG. 1, there is illustrated a glass sheet bending and tempering facility, indicated generally at 10, including in continuous sequential alignment a heating section 11, a bending section 12 and a chilling or tempering section 13. Glass sheets S to be bent and tempered are supported and conveyed through the facility upon a conveyor system 14, including successive series of rolls 15, 16 and 17.

As will be hereinafter more fully described, the rolls 15 of the first series support and convey the glass sheets S along a generally horizontal path through the heating section 11 and up to the area of the bending section 12. The glass sheets, upon emerging from the heating section, are received upon the rolls 16 of the second series and carried thereby into the bending section 12. Following bending to the precise desired curvature, the bent sheets are conveyed by the rolls 16 to the tempering section 13 where they are received upon the rolls 17 of the third series and carried thereby between opposed blast heads 18 and 19 of the tempering section.

The heating section 11 may be of any conventional construction and in the illustrated embodiment comprises a tunnel-type furnace 20 having a heating chamber 21 defined by a top wall 22, a bottom wall 23, opposite side walls 24 and an end wall 25. Such furnaces are conventionally heated by suitable heating means such as, for example, gas fired burners or electrical resistance elements (not shown) positioned in the top and side walls and suitably controlled to provide a desired heating pattern for glass sheets moving through the furnace. The sheets S are carried through the furnace on the series of rolls 15 of the conveyor system 14, which extend from the entrance end (not shown) of the furnace and out through an opening 26 in the end wall 25. As the sheets S are conveyed through the chamber 21 they are heated to substantially the softening point of the glass and, upon emerging through the opening 26 in the end wall 25, are received on the second series of rolls 16 for movement to and within the bending section 12, as will be hereinafter more fully described, between a pair of press members which impart the desired curvature to the sheets S.

After they are bent the sheets are advanced along the path of the conveyor system 14 and pass from the series of rolls 16 onto the series of rolls 17 for movement to the tempering section 13. The bent sheets S are advanced on the rolls 17 through the tempering section wherein their temperature is rapidly reduced to appropriately temper the glass. As illustrated generally in FIG. 1, within the tempering section the bent glass sheets pass between the blast heads 18 and 19 which include a plurality of tubes 27 and 28, respectively, disposed and operable to direct opposed streams of cooling fluid such as air or the like, toward and against the opposite surfaces of the sheets moving along the conveyor. It is understood if the facility is used for bending and annealing glass sheets for windshields or the like, the blastheads are not used and the sheets are allowed to cool slowly in a suitably controlled environment.

The glass sheets S are, of course, flat as they are introduced at the entrance end of the heating furnace 20, and thus the rolls 15 within the furnace are straight cylindrical rolls. As the glass sheets attain bending temperature and exit from the furnace, or even within the latter stages of the furnace, it has been found desirable for successive rolls of the second series of rolls 16 to be progressively contoured from the straight cylindrical shape of the cold end of the furnace toward the shape of the rolls which conform to the shape of the finished bent glass sheets, as in the third series of rolls 17 for carrying the bent sheets from the bending section into at least the initial stages of the tempering section. Consequently, the heated glass sheets moving over and in contact with the rolls are progressively preformed or bent during their movement from the furnace so that as they move into position for press bending, they will have attained a partially bent shape conforming generally to that of the mold and of the desired final configuration.

As best shown in FIG. 1, the press bending apparatus in the bending section 12 includes an upper male press member 29 and a lower female press member 30 having opposed complemental shaping surfaces conforming to the curvature to which the sheet is to be bent. The press members 29 and 30 are mounted for reciprocating relative movement toward and away from each other within a structural frame 31 which includes a framework of vertically disposed columns 32 interconnected by horizontally extending beams 33 to form a rigid, box-like structure. A horizontally disposed base member 34 extends between the columns 32 for supporting the female press member 30 and its associated parts.

The male press memer 29 is mounted above the conveyor rolls 16 for vertical reciprocal movement relative to the structural frame 31, and the lower female press member 30 is located below the conveyor rolls and mounted for vertical reciprocal movement toward and away from the male press member 29.

In order to accurately position the glass sheets S between the upper and lower press members 29 and 30, respectively, there is provided in the path of the advancing sheets between adjacent ones of the rolls 16 a pair of laterally spaced locator stops 35. Each stop 35 is affixed to the distal end of a piston rod 36 of a fluid actuated cylinder 37 mounted on the bed 38 of a vertically reciprocable carriage 39. The cylinders 37 are operative to raise and lower the stops 35 between an upper or raised position whereat they protrude above the rolls 16 into the path of movement of the glass sheets S, and a lowered position therebeneath.

The male press member 29 may comprise a suitable element (not shown) having a continuous lower surface corresponding to the configuration to which the sheets are to be bent or, as illustrated in the preferred embodiment of FIG. 1, may be of outline or ring-type construction comprising a continuous shaping rail 40 affixed to a base plate 41 by a plurality of connecting rods 42. The shaping rail 40 conforms in outline to the glass sheets S to be bent, and is provided with a downwardly directed, generally convex shaping surface 43 on its lower surface to impart the desired curvature to the sheet. It will, of course, be understood that the particular outline of the shaping rail 40 as well as the specific curved configuration of the shaping surface 43, are dictated by the desired shape of the sheets being bent and can vary widely to accomodate different parts.

The male press member 29 is operably supported by at least one actuating cylinder 44 mounted on one of the horizontally extending beams 33 and having a reciprocable piston rod 45 connected at its free end to a vertically reciprocable platen frame 46. The base plate 41 is affixed to the platen frame 46 for reciprocating movement therewith by means of interconnected structural members 47 and 48 and a support plate 49 extending transversely of the platen frame 46. Guideposts 50, connected at their lower ends to the four corners of the platen frame 46, respectively, extend upwardly through suitable bushings 51 mounted on the upper horizontally extending beams 33 for sliding movement therethrough to properly guide the platen frame 46 in its vertical reciprocating movement.

In accordance with the invention the lower or female press member 30 is also of outline or ring-type construction and includes a base plate 52 secured to the bed 38 of the carriage 39, and a shaping rail 53 connected in spaced relation to the base plate 52 by a series of connecting rods or posts 54. The shaping rail 53 conforms in outline to the glass sheets S to be bent and is provided on its upwardly directed face with a generally concave shaping surface 55 complementary to the male press member shaping surface 43 in opposed relationship thereto.

The carriage 39 is supported for vertical reciprocating movement by guide members 56 extending into and moveable through bushings 57 affixed to the horizontally disposed base 34. A fluid actuated cylinder 58 mounted on the base 34 includes a piston rod 59 affixed at its distal end to the bed 38 for moving the lower or female press member 30 between its lowered position beneath the conveyor rolls 16 and its raised position thereabove, for lifting a heated glass sheet S from the conveyor rolls and pressing it against the male press member 29 between the complementary shaping surfaces 43 and 55 to thereby bend the sheet precisely to the desired curvature. Upon completion of bending, the piston rod 59 is retracted to lower the female press member 30 below the conveyor rolls 16 and deposit the bent sheet thereon for advancement into the tempering section.

The contoured conveyor rolls employed in the bending area are preferably of the type comprising an inner, hollow, stationary core member and an outer, flexible, load-carrying, sleeve rotatable thereabout. Such contoured conveyor rolls are disclosed and described in the aforementioned U.S. Pat. No. 3,905,794 which is incorporated herein by reference. The construction of this aspect of the roll per se does not constitute part of the present invention, and reference may be had to the patent for details of the construction of a preferred form of core member and rotatable sleeve.

As hereinabove explained, contoured rolls of gradually increasing curvature may be employed leading into the press bending area beginning at the exit of the furnace 20. Likewise, such contoured rolls may also be advantageously employed in conveying the bent sheets from the press bending apparatus into the adjacent tempering section at least to the point where the sheets have been sufficiently cooled to retain their shape and no longer be susceptible to distortion due to contact with conventional conveying means. More particularly the contoured rolls, which may be employed with the same general construction at appropriate locations as desired in the series of rolls 15, 16, and 17, include a core member 60 as of stainless steel tubing and an outer, flexible, load carrying sleeve 61 surrounding and freely rotatable about the inner core member.

At one end of the contoured rolls the stationary inner core 60 is telescopically received upon and secured to a stub shaft 62 for mounting upon a side rail 63 of the structural framework. In order to support the roll end and secure the inner core against rotation while the sleeve 61 rotates thereabout, a short section 64 of square tubular stock is affixed as by welding about the stub shaft 62. The square tubular section is received in a correspondingly shaped notch 65 of a mounting block 66 affixed to the side rail 63, and secured therein by clamping plates 67 and fasteners 68 threaded into the mounting block.

Figure 2:
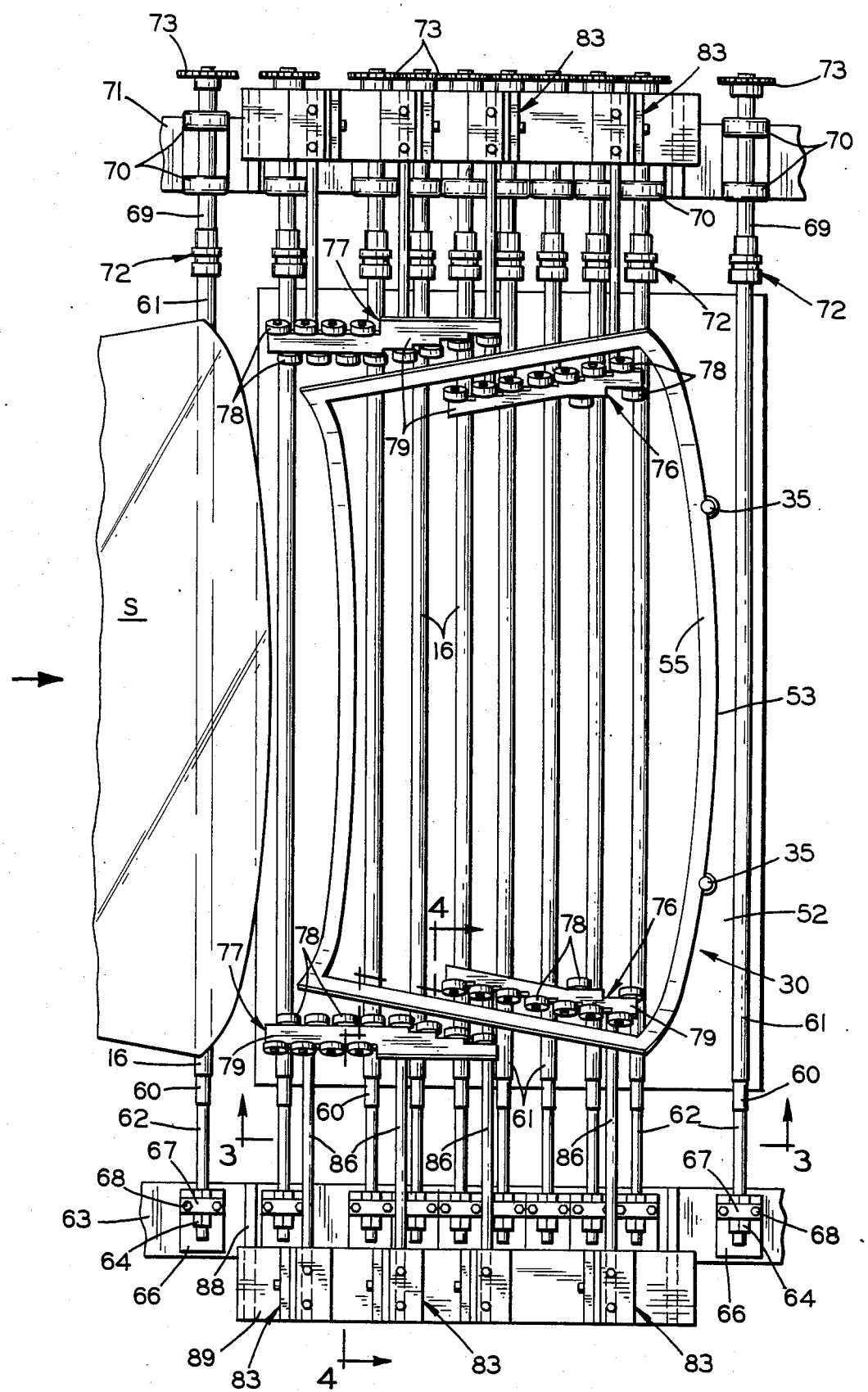
FIG. 2 is an enlarged, top plan view, looking in the direction of the arrows in FIG. 1, and illustrating the location of the novel rollers relative to the lower press member.

At its other or driving end the core member 60 likewise telescopically receives a stub shaft (not shown) which is fixed to the core member 60 and is concentrically journalled within a rotatable collar 69 (FIG. 2). The collar 69 is journalled for rotation in spaced bearings 70 carried on a side rail 71 of the structural framework of the bending apparatus. The end of the outer sleeve 61 is attached to the rotatable collar 69 by a coupling member 72 fixedly secured on the collar. A pinion 73, adapted to be driven by a suitable endless drive chain (not shown), is rigidly secured on each collar 69. Driving of the pinion 73 by the drive chain thus rotates the collar 69 about the stationary stub shaft extending thereinto from the core member 60 and, in turn, rotates the coupling member 72 so as to cause the outer sleeve 61 to rotate about the core member. The endless drive chain is trained about all of the pinions 73 of the contoured rolls in a series for rotating the outer sleeve 61 in unison at the same angular speed about their respective chordal axes.

Figure 4:
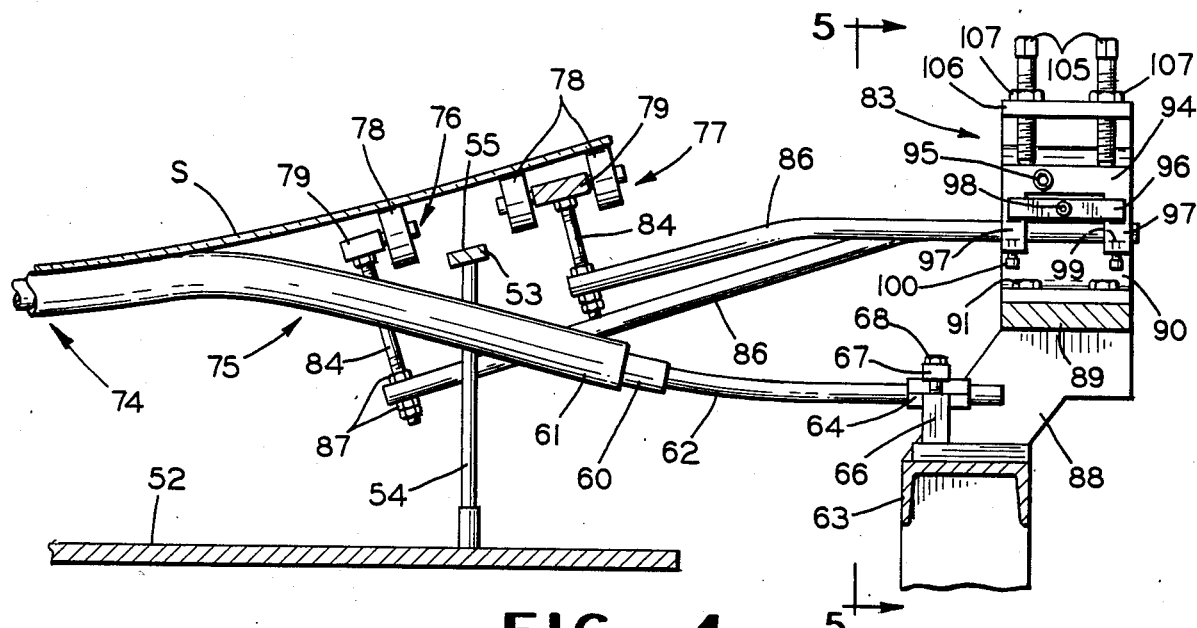
FIG. 4 is a fragmentary, enlarged, front elevational view, partly in section, taken substantially along line 4—4 of FIG. 2.

The rolls may, of course, generally assume the contour dictated by their location along the conveyor system which, in turn, is determined by the configuration of the sheet at that point. Thus, the contoured rolls heretofore have been of a generally concave configuration in the region beneath the sheets to follow the contour of the sheets at any particular location, with their ends mounted substantially in the plane of the conveyor system. In accordance with the invention the rolls of the series of rolls 16 are configured so as to permit unhindered operation of the lower or female press member 30. To that end as best seen in FIG. 4, the rolls include a generally concave central region 74 which engages the lower surface of the sheet, and end portions 75 which deflect downwardly away from the sheet to pass beneath the shaping rail 53 in its lowered position.

In order to support the end regions of the sheet as it advances into position above the lower press member 30 so as to minimize creation of distortion therein, there is provided at each end of the lower press member in accordance with the invention a system of free wheeling roller supports. More particularly, as best seen in FIGS. 2 and 4, interior and exterior roller carriages 76 and 77, respectively, are strategically located on either side of the shaping rail 53 so as to rollingly support the sheet as it advances into position thereabove while permitting unhindered vertically reciprocating movement of the continuous peripheral shaping rail to lift a sheet from the contoured rolls and the roller carriages for press forming between the shaping surfaces 43 and 55.

Figure 7:
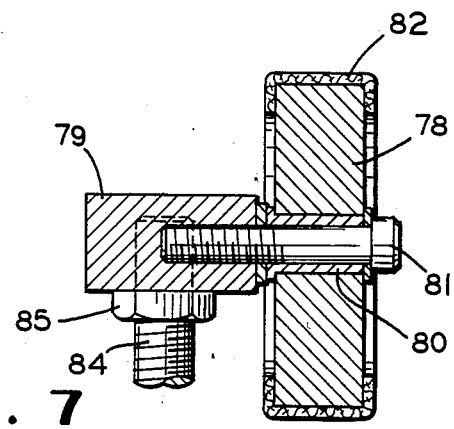
FIG. 7 is a sectional view along the axis of one of the rollers.

The roller carriages 76 and 77 are generally similar in construction and each comprises a plurality of rollers 78 mounted upon a support base 79 for rolling engagement with the lower surface of the sheets S. More specifically, the rollers 78 are journalled by means of a bushing 80 upon a stud axle 81 threaded into the support base 79 for free wheeling movement. The rollers are preferably covered by a sleeve 82 (FIG. 7) of a suitable material such as a glass fiber cloth to provide a resiliently yieldable, heat resistant non-marring surface for engaging the glass sheets. As will be apparent in FIGS. 2 and 4, the rollers are strategically located so as to support the end areas of the sheet along and adjacent the end segments of the shaping rail 53 in the region not engaged by the contoured rolls 16.

In order to avoid sliding movement between the sleeves 82 and the lower surface of the sheets, the rollers are preferably aligned with the path of the advancing sheets. The rollers are likewise preferably maintained normal to the surface of the sheet. To that end the roller carriages 76 and 77 depend from adjustable mounting fixtures 83 which permit the rollers to be suitably adjusted for accomodating changes in operating conditins. Each support base 79 is carried by a spaced pair of posts 84 threaded into the base and secured by jam nuts 85, the posts in turn being affixed to a cantilever arms 86 projecting from the mounting fixtures 83. The posts 84 extend through the cantilever arms 86 and are threaded, with nuts 87 on either side of the arm, so that the vertical position of the roller carriages can be varied by appropriate manipulation of the nuts.

Figure 5:
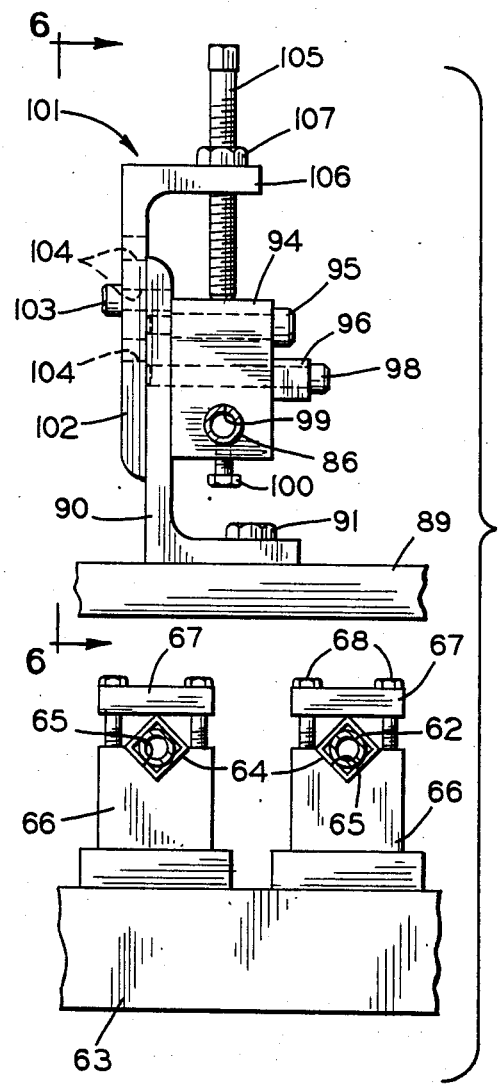
FIG. 5 is an enlarged side elevational view showing the support mechanism for the contoured rolls and rollers taken substantially along line 5—5 of FIG. 4.
Figure 6:
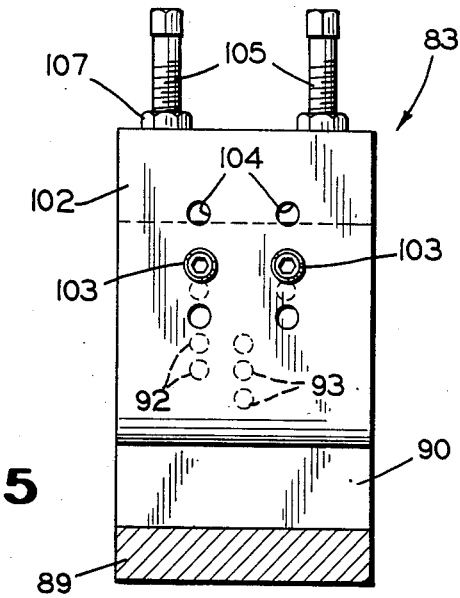
FIG. 6 is a side view of the mounting bracket for the rollers taken substantially along line 6—6 of FIG. 5.

The mounting fixture 83 is affixed to the side rail 63 by means of a bracket 88 having a mounting flange 89, and includes an angle member 90 secured to the mounting flange as by studs 91. For a purpose to be hereinafter explained, first and second rows of spaced vertically aligned threaded openings 92 and 93 are provided in the angle member. A U-shaped carrier bracket 94 is mounted on the angle member 90 so as to be pivotable about a stud shaft 95 extending therethrough and threaded into one of the openings 92. A clamping bar 96 extends across the legs 97 of the carrier bracket 94 and is urged into clamping engagement therewith by a fastener 98 threaded into one of the openings 93. As best shown in FIGS. 4 and 5, the cantilever arms 86 of the roller carriages 76 and 77 extend into and through axially aligned openings 99 in the legs 97 and are secured therein against axial and rotational movement by means of set screws 100. To assist in precisely orienting the roller carriages an adjusting mechanism, identified generally at 101, is provided in conjunction with the pivotably mounted carrier bracket 94. Thus, an inverted angle section 102 is affixed to the angle member 90 as by a pair of spaced studs 103. In order to accomodate different positions of the carrier bracket, the angle section is provided with a plurality of rows of openings 104 through which the studs 103 may be selectively inserted to position the angle section at the appropriate height. Spaced adjusting screws 105 threaded through the flange 106 of the angle section 102 bear at their ends against the carrier bracket 94 on either side of the stud shaft 95, so that by manipulating the screws 105 the bracket may be caused to appropriately pivot about the stud shaft. Jamb nuts 107 are provided on the adjusting screws 105 for securing them in selected positions.

It will thus be apparent that provision is made through the adjustable mounting fixtures 83 and posts 84 for the roller carriages 76 and 77 to be selectively positioned to correctly support the end regions of the sheets S for operation of the lower female press member 30. Adjustments can be readily made while the apparatus is in operation to assure proper functioning. Thus, the cantilever arms 86 may be positioned axially within the openings 99 to move the carriages in or out. The carrier bracket 94 may be placed in selected vertical locations by means of the openings 92 and 93 and stud shft 95 and fastener 98, respectively, and the angular attitude of the roller carriages may be adjusted by loosening the fastener 98 in the clamping bar 96 and manipulating the adjusting screws 105 to pivot the carrier bracket 94 about the stud shaft 95.

Reviewing briefly operation of the invention, glass sheets S are carried through the furnace 20 by the conveyor system 14 where their temperature is gradually raised to the softening point of the glass. The heated sheets are received from the furnace upon contoured rolls whereupon they tend to sag into conformity with the rolls as they are advanced into position for press bending between the upper and lower press members 29 and 30. The end portions 75 of the contoured rolls 16 in the press bending area curve downwardly beneath the shaping rail 53 of the lower press member 30, and the end areas of the sheets are rollingly received upon and supported by the roller carriages 76 and 77 as they move into position for press bending. The leading edge of the sheet engages the locator stops 35 when the sheet is properly positioned, and the sheet is then lifted from the contoured rolls and roller carriages by the continuous peripheral shaping rail 53 for press bending between the shaping surfaces 43 and 55. The lower press member 30 and shaping rail 53 are then retracted and the precisely curved sheet S is deposited on the contoured rolls for advancement into the tempering section 13. While the sheet has by this time generally cooled sufficiently to retain its shape, the contoured rolls provide support to assure that further sagging does not occur upon immediate removal of the support of the shaping rail 53.

It is to be understood that the form of the invention herewith shown and described is to be taken as an illustrative embodiment of the same, and that various changes in the shape, size and arrangement of parts, as well as various procedural changes, may be resorted to without departing from the spirit of the invention.

We claim:

1. A method of bending a glass sheet to a desired curvature comprising heating the sheet to its softening point, supporting and advancing the heated sheet on a series of conveyor rolls having progressively greater curvature to a position spaced above a shaping surface corresponding to the peripheral outline of said heated sheet, whereby said heated sheet is initially bent on said conveyor rolls and arrives at said position having its opposite end portions displaced above its intermediate section, and supporting said end portions above said shaping surface independently from said conveyor rolls as said sheet moves into said position above said shaping surface.

2. A method of bending a glass sheet as claimed in claim 1 wherein said end portions are independently supported by rollingly engaging the bottom surface of said end portions of said sheet.

3. A method of bending a glass sheet as claimed in claim 2, in which said rolling engagement is free wheeling.

4. A method of bending a glass sheet as claimed in claim 1, wherein said shaping surface is of continuous peripheral outline, and said end portions are supported both inside and outside said shaping surface.

5. A method of bending a glass sheet as claimed in claim 4, wherein said end portions are independently supported by rollingly engaging the bottom surface of said end portions of said sheet, including the steps of elevating said shaping surface to lift said initially bent sheet from said curved conveyor rolls and the independent end portion supports and press it between said shaping surface and a complemental shaping surface to impart a final desired shape to said sheet, and lowering the shaping surface to deposit the finally bent sheet on said curved conveyor rolls.

6. A method of bending a glass sheet as claimed in claim 5, in which said support of said end portions is by free wheeling rolling engagement, and including activating said curved conveyor rolls to advance said finally bent sheet from said position above said shaping surface on said conveyor rolls.

7. Apparatus for bending a glass sheet comprising peripheral shaping rail generally conforming to the marginal outline of the glass sheet to be bent thereon and including oppositely disposed side and end segments and an upwardly facing shaping surface, said shaping rail being moveable between lowered and raised positions, a plurality of conveyor rolls for advancing the glass sheet and supporting said sheet in a position spaced above said shaping rail in said lowered position, said conveyor rolls including arcuately shaped central sheet supporting portions for preliminarily bending said glass sheet and end portions extending below said end segments of said shaping rail, roller means positioned adjacent at least one of said shaping rail end portions for supporting the associated end portion of said sheet above said shaping rail with said shaping rail in said lowered position, and means for moving said shaping rail and said shaping surface thereon from said lowered to said raised position to thereby lift said glass sheet from said conveyor rolls and said roller means to effect final bending of said glass sheet.

8. Apparatus for bending a glass sheet as claimed in claim 7, wherein said roller means comprises a carriage including at least one free-wheeling roller mounted for rolling engagement with the bottom surface of said sheet end portion.

9. Apparatus for bending a glass sheet as claimed in claim 8, including roller means positioned adjacent each said shaping rail end portion, wherein each said carriage includes a plurality of said free-wheeling rollers.

10. Apparatus for bending a glass sheet as claimed in claim 8, including a first said roller means mounted inside and a second said roller means mounted outside said end segment of said peripheral shaping rail whereby said shaping rail end segments pass between said first and second roller means as said shaping rail moves between said lowered and raised positions.

11. Apparatus for bending a glass sheet as claimed in claim 7, wherein said conveyor roll end portions extend beneath said end segments of said shaping rail, including means mounting said conveyor rolls outside said peripheral shaping rail.

12. Apparatus for bending a glass sheet as claimed in claim 11, wherein said conveyor rolls comprise a rotatable outer sleeve surrounding a stationary inner core.

13. Apparatus for bending a glass sheet as claimed in claim 8, including a sleeve of resiliently yieldable, heat resistant, non glass-marring material covering said roller for engaging the surface of said sheet.

14. Apparatus for bending a glass sheet as claimed in claim 8, including a cantilever arm, means affixing said carriage to the free end of said cantilever arm, and means adjustably supporting said cantilever arm at its fixed end outwardly of said end segment of said peripheral shaping rail.

15. Apparatus for bending a glass sheet as claimed in claim 14, wherein said means adjustably supporting said cantilever arm includes means providing movement of said arm toward-and-away, up-and-down, and angularly, relative to said glass sheet for adjusting the position of said roller beneath said end portion of said glass sheet.

16. Apparatus for bending a glass sheet as claimed in claim 10, wherein said first and second roller means are positioned adjacent each said shaping rail end portion, each said carriage including a plurality of said free wheeling rollers, and a sleeve of resiliently yieldable, heat resistant, non glass-marring material covering said rollers for engaging the surface of said sheet.

17. Apparatus for bending a glass sheet as claimed in claim 16, wherein said conveyor roll end portions extend beneath said end segments of said shaping rail, including means mounting said conveyor rolls outside said peripheral shaping rail, said conveyor rolls comprising a rotatable outer sleeve surrounding a stationary inner core.

* * * * *